United States Patent [19]

Lloyd

[11] 4,075,379
[45] Feb. 21, 1978

[54] MELT-EMBOSSED POLYMER FILM

[75] Inventor: Ronald Lloyd, Sawbridgeworth, England

[73] Assignee: Smith & Nephew Plastics Limited, England

[21] Appl. No.: 587,875

[22] Filed: June 18, 1975

[30] Foreign Application Priority Data

June 19, 1974 United Kingdom ............... 27218/74

[51] Int. Cl.² .............................................. D04G 1/00
[52] U.S. Cl. ........................... 428/105; 264/DIG. 81; 428/107; 428/255; 428/910
[58] Field of Search ................428/255, 105, 107, 910; 264/167, 210 R, 147, 284, DIG. 81

[56] References Cited

U.S. PATENT DOCUMENTS

| | | | |
|---|---|---|---|
| 2,919,467 | 1/1960 | Mercer | 428/255 |
| 3,387,069 | 6/1968 | Stohr | 264/145 |
| 3,914,365 | 10/1975 | Kim et al. | 264/147 |
| 3,952,127 | 4/1976 | Orr | 264/167 |

Primary Examiner—Jay H. Woo
Attorney, Agent, or Firm—Robert L. Goldberg

[57] ABSTRACT

A melt-embossed polymer film is provided on one surface with a set of parallel grooves and on the other surface with a second set of parallel grooves at an angle to the first, the combined tapes of the grooves being at least substantially equal to the thickness of the film. The ratio between the intersection area common to two ribs on different surfaces and the cross-sectional area of each rib is low, e.g. not greater than 2:1 to ensure transmission of orientation on subsequent stretching. The ribs between the grooves may be square, trapezoidal (provided that the included angle of the tapering sides is not greater than 45°) or wider at its outer part than at its inner part. Ribs of these shapes, especially the last named, can be produced by using deformable, e.g. rubber, profiling means.

8 Claims, 23 Drawing Figures

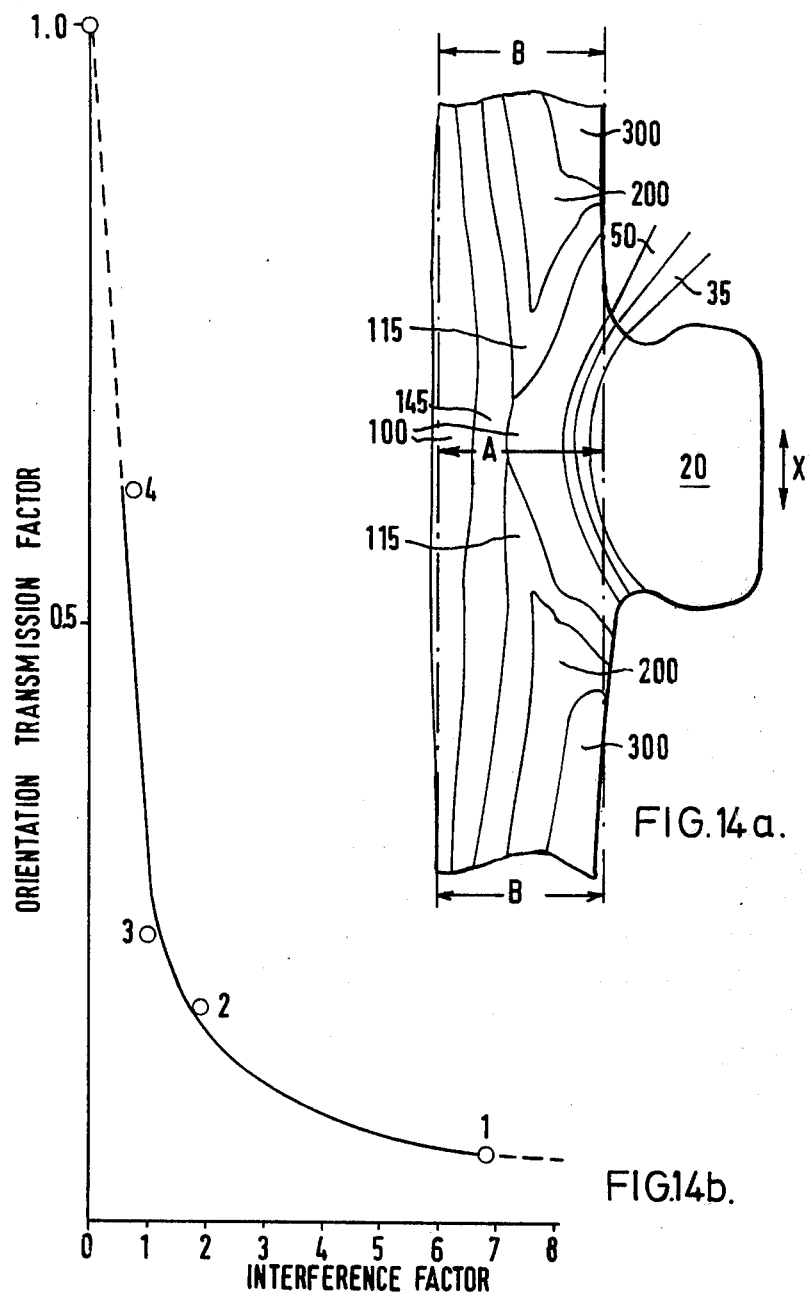

MELT-EMBOSSED POLYMER FILM

This invention relates to a melt-embossed polymer film, to a method of making such film, and to a net produced by stretching such film.

Melt-embossing is a technique of profiling molten polymeric materials in which a molten film of the material is passed into a nip, e.g. between two rollers, and substantially simultaneously profiled and solidified to emerge as a solid film.

It is known to produce such films with patterns of ribs and grooves. In particular it is known to produce such film with on one fact a set of straight parallel grooves and on the other face a second set of straight parallel grooves lying at an angle to the first set. When biaxially stretched this film splits in a controlled fashion into a net of synthetic polymeric material.

Such films have hitherto been provided with grooves triangular in cross-section, i.e. converging to a line at the base of the groove, and thus leaving between them triangular or trapezoidal section ribs.

The present invention provides, in one aspect a melt-embossed film of synthetic polymeric material having on one face a set of parallel grooves and on the other face a second set of parallel grooves lying at an angle to the first set sufficiently deep to leave at the groove intersection areas a thin splittable membrane, the grooves in each set defining between themselves a set of parallel ribs; wherein the ratio between (I) the intersection area common to two ribs of different sets and (II) the cross-sectional area of each rib, is low to ensure transmission of orientation through the rib intersection on subsequent stretching.

Specific rib shapes of interest include (i) a trapezoidal cross-section with an included angle of not greater than 45°, and its narrower face outwards (ii) a square cross-section (iii) a cross-section wider at its outer part than at its inner part.

The ratio I:II is preferably not greater than 2:1, and most preferably not greater than 1:1. When it is less than 1:1, it is equivalent to saying that the cross-section of each groove on at least one and preferably both faces is wider at the base than at the mouth.

Usually the ribs will be spaced with their centre lines at twice their width; from 5 to 300, and preferably 10 to 100 ribs per inch can be used (2-120 and 4-40 per cm. respectively).

Usually moreover the parallel grooves are straight grooves, although they may be wavy or undulating. Moreover, the top of the ribs between the grooves, and/or the bottoms of the grooves, may be wavy or undulating in the vertical plane.

Such film on stretching appears to yield a net of higher tensile strength than that given by corresponding triangular-grooved film of high I:II ratio, apparently because of the smaller areas of interference between overlying strands, which allows good orientation along the whole length of the strands.

In another aspect the invention provides a method of producing a melt-embossed film as described above comprising the steps of melting a synthetic polymeric material; extruding the molten material as a molten film; passing the film into a nip defined between two cooled and profiled members to solidify and profile the film; and withdrawing the profiled film from the nip: wherein the profiled members are each provided with a set of parallel ribs and grooves on the profiling surface, the two sets being angled with respect to each other and the ribs and grooves providing sets of complementary grooves and ribs on each surface of the film such that the intersection area common to two grooves of different sets is a thin splittable membrane, and that the ratio between (I) the intersection area common to two ribs of different sets and (II) the cross-sectional area of each rib, is low to ensure transmission of orientation through the intersection on subsequent stretching.

The I:II ratio is again preferably not greater than 2:1. As described in more detail below, the profiling surface can be rigid, but in a preferred form of the invention at least part of the profiling surface of at least one profiling member is resilient and is deformed during the profiling operation to modify the shape of the ribs on the film.

The method can be carried out continuously by passing the molten film into the nip between two cooled and profiled rollers in pressure contact. In preferred embodiments the two sets of grooves can each be angled at 45° in the same sense or "hand", or one roller can have circumferential and the other axial grooves. The grooves on the respective rollers can have the same or different spacing.

The invention still further provides, as a major aspect, the net produced by biaxially stretching the film as described above. Stretching is usually above 50%, e.g. 50%–2000%, preferably 50–500% and may be e.g. 200–300%. Preferably, the net strands intersect at right angles. Preferably moreover total strain averaged across a single strand at an intersection compared to the total strain averaged across the same strand halfway between intersections is not less than 0.15, e.g. 0.2 to 0.7.

Such a net may be independently characterised as possessing a plurality of strands occupying two different parallel planes and joined by integral intersections, each strand being oriented lengthways between the intersections and the orientation being transmitted at least in part through the intersection over the whole cross-sectional area of the strand.

The invention will be further described with reference to the accompanying drawings, in which FIGS. 1 to 3 are for purposes of comparison only.

Figure 9A:
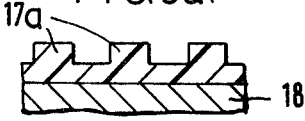
Figure 9B:
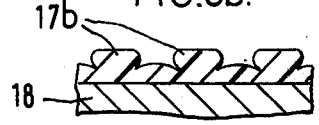
Figure 10A:
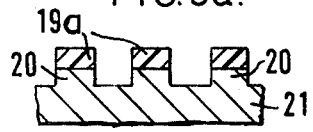
Figure 10B:
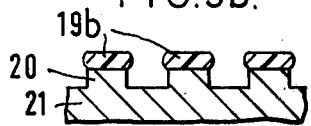
Figure 13:
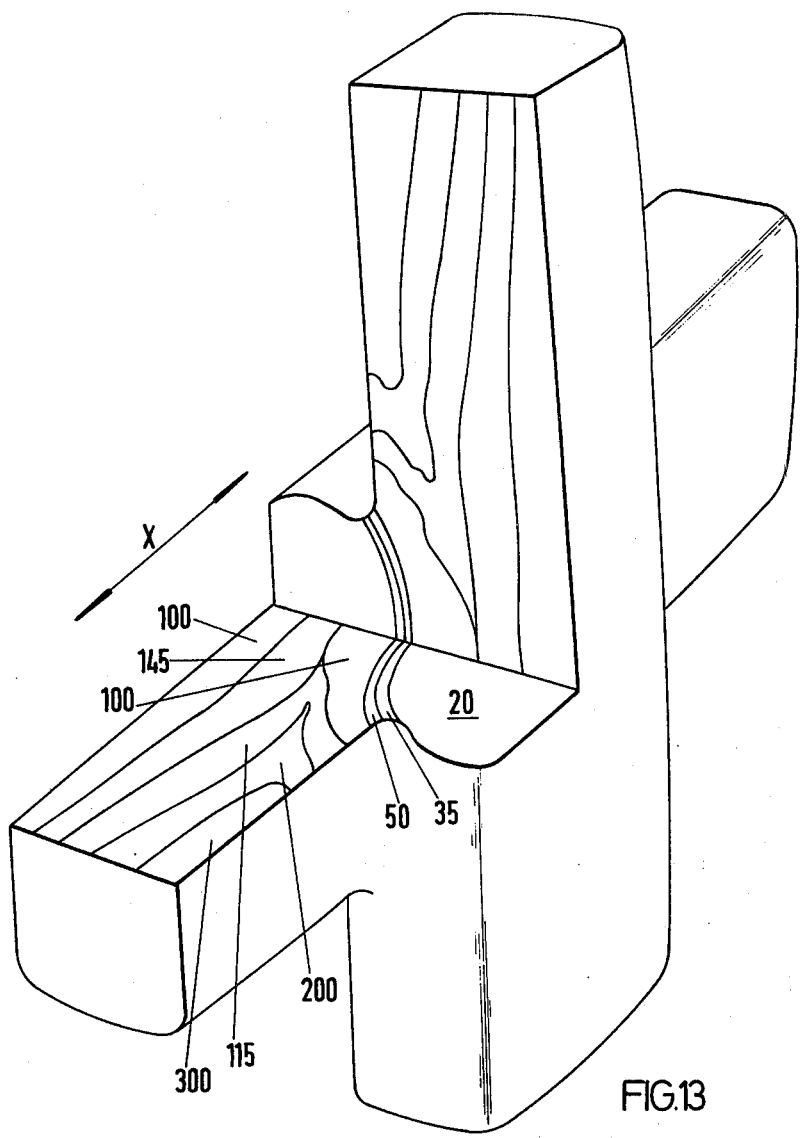
Figure 15A:
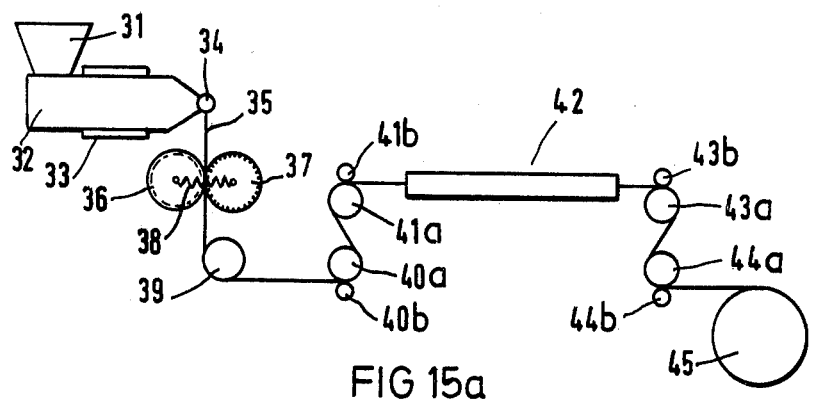
Figure 15B:
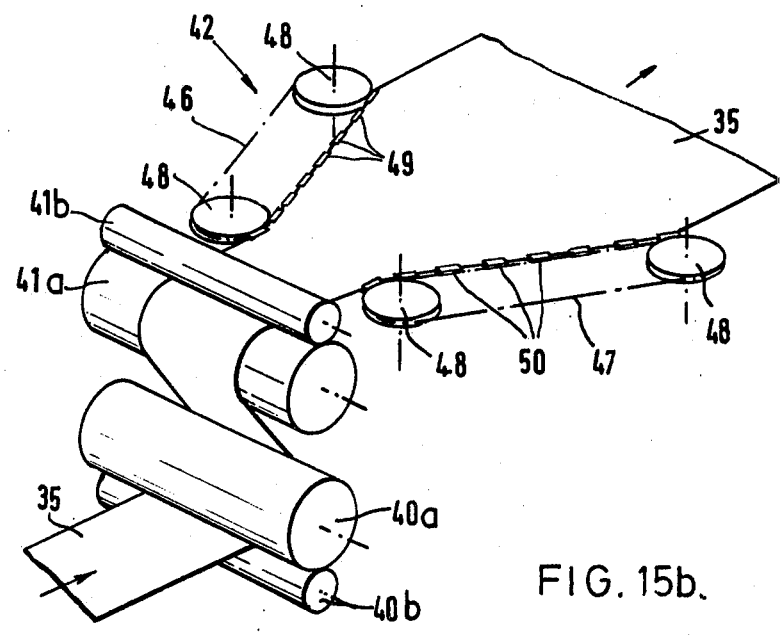

FIGS. 9a, 9b; 10a, 10b; 11a, 11b; and 12a, 12b similarly show in scrap cross-section other roller rib configurations which may be used;

FIG. 13 shows a partial cross-section in perspective view of a net intersection, indicating the different degrees of strain in different regions;

FIG. 14a shows a section through a net intersection again indicating the different degrees of strain in different regions, and FIG. 14b is a graph relating the type of net to the transmission or orientation through such intersection; and FIG. 15a shows in diagrammatic form a production line for producing a net continuously while FIG. 15b shows in fragmentary perspective view part of the equipment of FIG. 15a.

Figure 1:
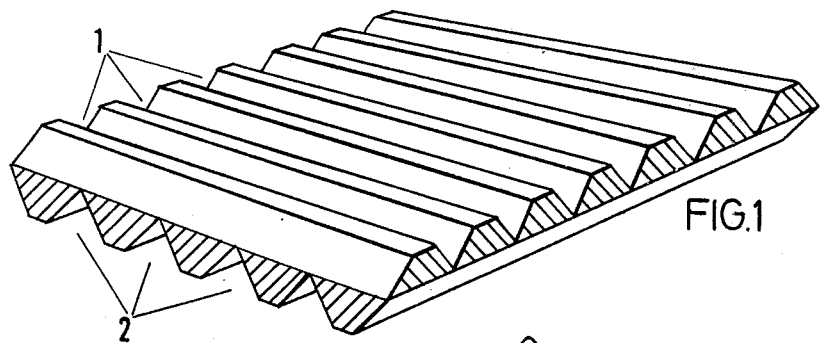
FIG. 1 shows a portion of a prior art film prior to stretching into net.

FIG. 1 shows a film of synthetic polymeric material such as high density polyethylene (HDPE) or polypropylene (PP) provided on one face with a first set of parallel grooves 1 each of 120° triangular cross-section, and on the other face a second set of like parallel grooves 2 at a different angle. Trapezoidal-section ribs are left between the grooves. Usually, but not essentially, the difference of angle is 90°, the grooves either being both at 45° to the longitudinal or being in the machine and transverse directions respectively.

This material is well known and is produced by passing a molten polymer film between two rollers each with closely packed parallel V-section grooves separated by V-section ribs, each set of grooves being of the same "hand", to simultaneously emboss and solidify the film. In practice, the polymer does not reach the bottom of the roller grooves, which account for the trapezoidal shape of the ribs on the film. In practice moreover this procedure leaves a thin intermediate membrane between the two sets of grooves in the film, but this is not shown for ease of drawing.

Figure 2:
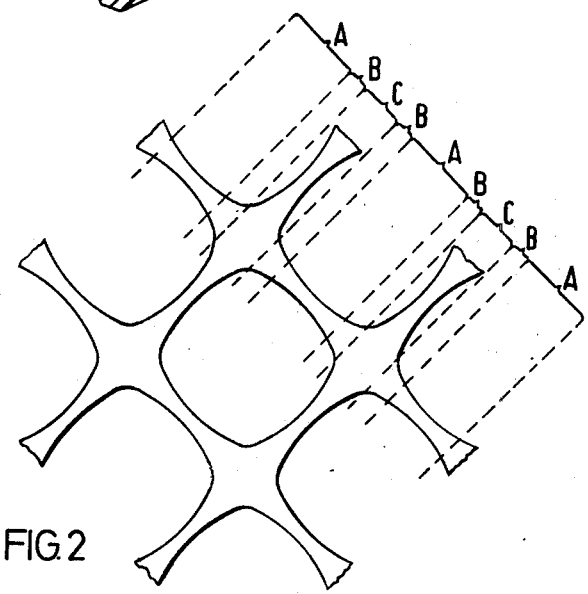
FIG. 2 shows a fragment of net produced on stretching.

When the film of FIG. 1 is biaxially stretched it splits in a controlled manner to form a net, a fragment of which is shown in FIG. 2. Each strand of this net exhibits a repetition of three regions, merging into each other in the order shown at A, B and C. Region A is highly oriented and of high tensile strength. Region B, the "shoulder" area, is of intermediate characteristics. Region C, the intersection, is unoriented and of low strength, but fairly massive.

Breakage of the net tends usually to start in the regions B. Tendency to breakage could be decreased if the orientation at strand regions A could in some way be transferred along the strands, i.e. through regions B and into and through intersection regions C. This does not happen in practice because, as shown in FIG. 3, each ideal rib 3 of the embossed film has a succession of interference areas I, Ia, Ib along one face hindering stretching and consequently preventing orientation.

Figure 3:
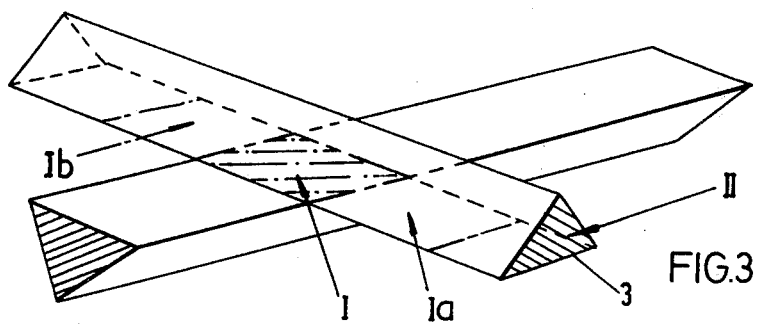
FIG. 3 shows in idealised form two intersecting strands of such prior art net.

Hitherto the ratio of the interference area of the strand, shown at I in FIG. 3, to the cross-sectional area II has been high. For instance I:II, in prior art films, has usually been about 7:1, and always 3:1 to 4:1 or above.

Figure 4:
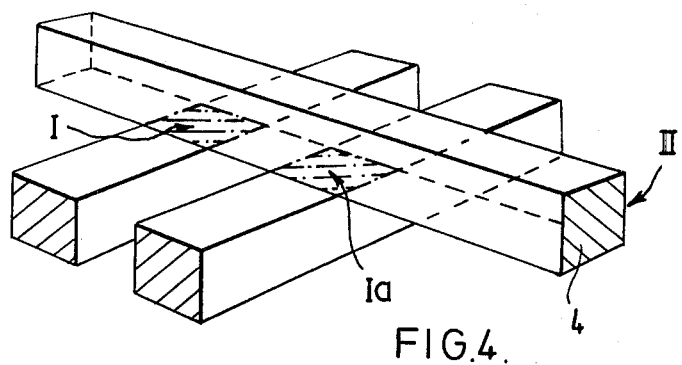
FIG. 4 shows in idealised form the intersection of square-section strands of net.

FIG. 4 shows in an idealised representation a fragment of a film where the ratio I:II is 1:1. Moreover, the intersection areas I are spaced apart along the square-section ribs 4. Once again the inevitable membrane between the ribs is omitted for ease in drawing.

We have now discovered that provided the geometry of the film is such that the ratio I:II is low (e.g. 2:1 or below and most preferably 1:1 or below) it appears that there is good transmission of orientation through the intersections of the net. This ratio I:II is a governing factor, and other characteristics such as spacing of the intersections, angle of intersection and shape of strand cross-section appear to exert only a minor effect on this transmission of orientation.

Figure 5:
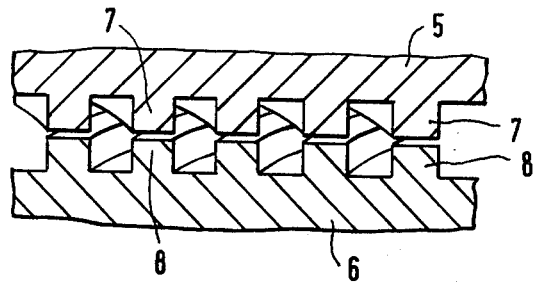
FIG. 5 shows a means for producing a net of the characteristics of FIG. 4.

FIG. 5 shows in scrap section part of a pair of metal rollers 5 and 6 for producing film of the characteristics shown in FIG. 4. These rollers are each formed with a set of parallel grooves and the two sets are angled 90° apart, each at 45° to the longitudinal, i.e. machine, direction. The square-section roller ribs 7 and 8 defined between these grooves do not in practice touch since liquid polymer rapidly solidifies between them.

Figure 5A:
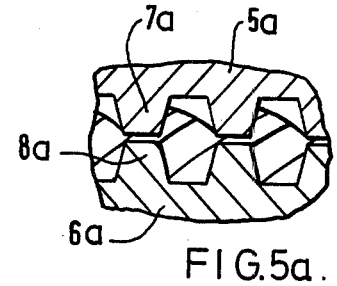
FIG. 5a shows a variant form thereof.

FIG. 5a shows, also in scrap section, a pair of metal rollers 5a and 6a but wherein the roller ribs 7a and 8a have sloping sides, each rib having an included angle of 45°. The rollers are otherwise as shown in FIG. 5. Such a pair of rollers gives a film in which the I:II ratio (see FIG. 4) is about 2:1. Although greater than unity this is still considerably less than the I:II ratio encountered in existing nets.

Both FIGS. 5 and 5a show rollers where the set of ribs is angled at 45° to the machine direction. However, this angle can vary from 0° to 90°, i.e. the ribs can be circumferential or axial or at any angle in between. Preferably they intersect at 90° (and circumferential/axial intersection is especially preferred) but any angle of intersection is possible provided that the intersection area I is not unduly increased. The rollers need not possess identically angled ribs. The spacing of the roller ribs can be varied over a wide range although usually it is desirable for the ribs and grooves on the roller to be of generally equivalent sizes. Usually from 5 to 300 ribs are present per roller inch, and more preferably from 10 to 100. Thus, square-section ribs spaced at 14 to the inch (i.e. 5 or 6 to the centimeter) with equivalent square-section grooves left between them have been found valuable.

Biaxial stretching preferably takes place in the directions of the strands i.e. the ribs on the embossed film. The extent of stretching, and methods of operation, are well-known in this art and are described for example in our British Patent No. 1,110,051 and U.S. Pat. No. 3,488,415. These moreover give information about roller sizes, temperatures, speeds of operation, etc. The man skilled in the art will appreciate that the present invention is related to the choice of rib shapes on the roller, and not primarily in these other features.

The rollers shown in FIGS. 5 and 5a possess metal ribs which are non-deformable. It is also within the scope of the invention to provide ribs on one or both rollers deformable under pressure.

Figure 6:
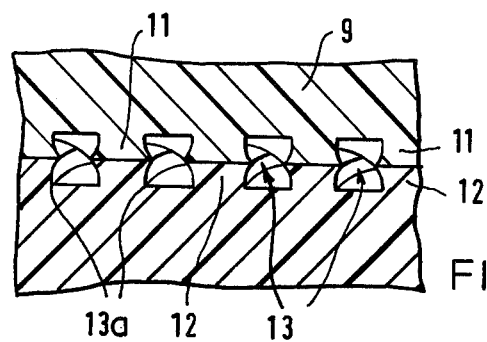
FIG. 6 shows a means for producing a further film stretchable into net according to the present invention.

FIG. 6 shows rubber rollers 9 and 10, with ribs shaped as in FIG. 5, held under sufficient pressure to distort the roller ribs 11 and 12 for instance into the shape shown. Again, there will in use usually be a film of solidified polymer between opposed roller ribs 11 and 12. The rollers can either be completely made of rubber, or be metal rollers with a rubber sleeve.

Because the ribs 11 and 12 are deformable the polymer which solidifies in the space 13 can in fact be removed as a ribbed film of novel characteristics. Of course, the polymer may not be forced completely into the acute corners 13a, but the eventual strands and their intersections will be somewhat as shown in FIG. 7, it again being understood that the membrane regions are not shown for ease of illustration.

Figure 7:
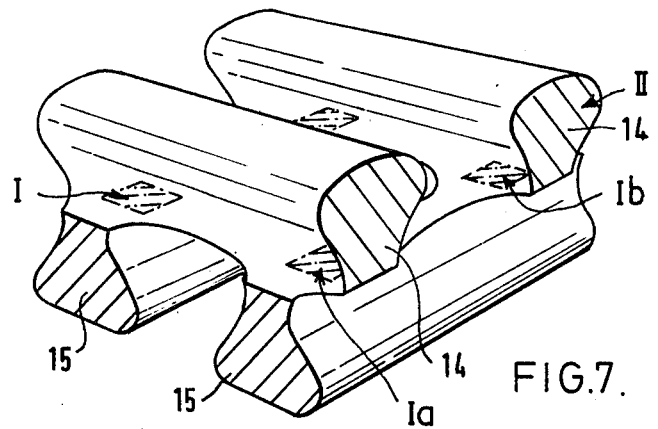
FIG. 7 shows in idealised form the intersection of strands of net made with equipment shown in FIG. 6.

In FIG. 7 each strand is somewhat wider at its outer face than at its inner face where it contacts the underlying strands which are differently angled. The intersection areas of strands 14 and 15 are shown as Ia, Ib, I, and the cross-section of strands as II. Ratio I:II in such a case is less than unity. Because of this there is less resistance to transmission of orientation through the intersections areas on stretching, and thus a higher strength net is eventually produced.

While the Applicants do not desire to be bound by any hypothesis as to the mode of action of the invention, it appears that the "strands" of the eventual embossed film and of the net formed from it, are formed in different planes, thus enabling orientation to be transmitted through the areas of intersection and therefore improved strength.

Figure 8A:
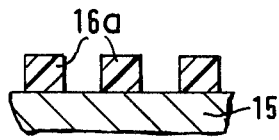
FIGS. 8a and 8b show in scrap section configurations of roller ribs on a composite metal/elastomer roller, both before and after compression.
Figure 8B:
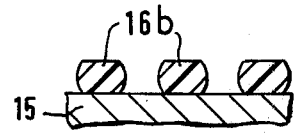

FIGS. 8a and 8b show a metal roller 15 with separate square-section circumferential rubber ribs 16a formed upon it, to be used with a similar, but axially, ribbed rubber. Under pressure the ribs deform, possibly as shown in FIG. 6 or possibly as shown at 16b depending on the characteristics of the rubber.

Further variants of this are shown in FIGS. 9 to 12. In FIG. 9a shallow ribs 17a are formed on a rubber shell over roller 18, and deformed as shown at 17b of FIG. 9b. In FIGS. 10a and 10b a rubber top 19a and 19b is provided for each shallow integral metal rib 20 on roller 21. Since only the top 19b becomes deformed, generally square ribs with "pinched" intersections are formed on the eventual film. In FIGS. 11a and 11b a generally similar configuration of roller 22, shallow integral metal ribs 23 and a top 24a and 24b is provided, but the undeformed top 24a possesses a shallow V-shaped groove 25 in its top surface which disappears under pressure to give a particularly useful deformed shape as shown at 24b. Finally, in FIGS. 12a and 12b the roller 26, ribs 27, top 28a (undeformed) and 28b (deformed) and V-shaped groove 29 are further supplemented by a like V-shaped groove 30 in the underlying metal rib to give a further improvement in shape to the deformed portion 28b.

FIG. 13 shows a partial section of an intersection of a net produced by stretching a square-grooved polypropylene film (with grooves on opposite faces at right angles) by about 200%–300% in each of the two strand directions. The strands formed are identifiably in different planes. Marked on the "horizontal" part of the section, with "contour" lines, are regions of different percentage strain, measured in every instance in the direction defined by arrow X. There is clearly good transmission of strain through the intersection area. Of course, since the net is symmetrical the same type of distribution of strain will appear in the other (vertical) strand. The contour lines for this are shown on the "vertical" face but to avoid confusion the numbers have not been inserted.

FIG. 14a shows the same intersection in a different sectional view, again demonstrating how there is good transmission of strain throughout the intersection area.

FIG. 14a also shows regions A and B. By averaging the strains across these regions and comparing them a numerical measure can be obtained related to the effectiveness of transmission of strain, and thus of orientation, through the intersection. FIG. 14b is a graph relating the interference factor, i.e. I:II as shown in FIGS. 3, 4 and 7, to the orientation transmission factor i.e. Total strain at A : Total strain at B, in FIG. 14a. The four numbered points relate respectively to films profiled:

Point 1 — as in FIG. 3, with a 120° included angle (i.e. the prior art), I:II about 7:1.

Point 2 — as in FIG. 5a, with 45° included angle, I:II about 2:1.

Point 3 — as in FIG. 5, square-section grooves, I:II about 1:1.

Figure 11A:
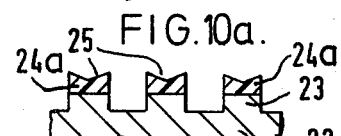
Figure 11B:
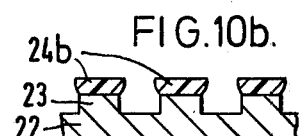
Figure 12A:
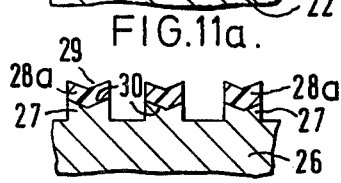
Figure 12B:
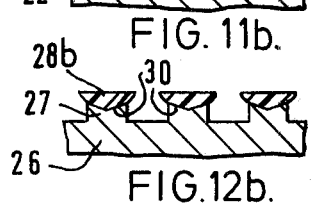

Point 4 — as in FIGS. 11a and 11b, "pinched" intersection, I:II about 0.8:1.

The orientation transmission values are as shown. Hitherto the advantages and possibility of working in the steep, high-transmission left-hand portion of the resulting curve have not been appreciated.

Further description of the film and of results obtained in testing is as follows:

Polypropylene homopolymer of melt flow index 4 was extruded from a flat die at melt temperature 240° C and embossed between profiled surfaces as described above maintained at 30° C. In each case the surfaces had 14 grooves/inch and embossing pressure was 110–130 psi.

The die gaps (i.e. original film thicknesses) used were:

|  | inches | mms |
| --- | --- | --- |
| Rubber faced | 0.027 | 0.69 |
| Square steel | 0.027 | 0.69 |
| 45° steel | 0.017 | 0.43 |
| 120° steel | 0.010 | 0.25 |

Grooves were completely filled and a membrane left in the embossed sheet of thickness 0.003–0.004 inch (0.08 – 0.1 mm).

Embossed sheets were stretched (sequentially in length and transverse directions) to elongations 50%–500%, in a stream of air heated to a temperature of 120° C.

Sections were cut and birefringence values determined for the various regions shown in the diagram. These values were compared with those obtained from polypropylene sheets previously stretched by known amounts and thus converted into % strain.

At cross-over regions, as shown in FIGS. 13a and 14a, the strands are in essentially two discrete planes. Also, the graph of orientation transmission factor versus interference factor shows that the orientation transmission is greatest for the undercut rib produced by the rubber-faced ribs. The rubber used was a urethane rubber available under the name Devcon Flexane of hardness 30–90 Shore, which is cold curing, of good adhesion properties, temperature-resistant and of negligible volume change under compression. The subsequent variation in orientation transmission with varying interference factor is reflected in the strand tenacities of the respective nets, being greatest for net produced from rubber faced surfaces.

|  | 120° G/S | 45° | Square | Rubber |
| --- | --- | --- | --- | --- |
| Strand tenacity (g/denier) | 1.0 | 1.1 | 1.3 | 1.5 |
| Base Film g/m² | 390 | 600 | 890 | 670 |
| Net g/m² | 78 | 73 | 61 | 56 |
| Openness/Strands/10cm | 34 | 22.5 | 14.5 | 16 |

These figures are calculated from the breaking load of strands, with the denier averaged along the lengths of the strands.

FIG. 15a shows diagrammatically a production line for producing net according to the invention in a continuous fashion. A hopper 31 supplies a barrel extruder 32 surrounded by heating coils 33, and this extruder feeds molten polymer to a slit die 34 from which it issues as a vertical film 35 into the nip between a circumferentially ribbed roller 36 held in pressure contact by spring 38. This nip profiles and solidifies the film substantially simultaneously.

The solidified film passes round roller 39, into the nip between first pair of rollers 40a and 40b and from them into the nip between second pair of rollers 41a and 41b.

Since roller 41a rotates faster than roller 40a longitudinal stretching and orientation is effected.

The longitudinally stretched film passes into an axially-stretching stenter frame 42 described below to provide axial stretch and orientation. From this it passes into the nips between rollers 43a, 43b and 44b successively, in this instance 44a rotating faster than 43a to effect further longitudinal stretching. Finally it passes to wind-up roller 45.

In FIG. 15b the same reference numerals are used as in FIG. 15a. The essential features of the stenter frame are two endless chains 46, 47 each passing round a pair of vertically journalled sprockets 48 and provided with a row of clips 49 and 50 respectively. The paths taken by the chains diverge, as shown.

As the chains rotate, in synchronism with the film, a pair of clips arrive at, and clamp on, opposite edges of the film as it leaves roller 41a. The film is therefore stretched transversely as the clips become further apart on their diverging paths, with additional pairs of clips successively gripping the film as they arrive at the correct location.

Of course, various additional details, such as trimming knives, heating ovens, additional stretching stages and like expedients can be supplied as will be well known to the man skilled in the art.

Suitable polymers, in addition to the polypropylene exemplified, would be polyolefins in general (such as high density polyethylene, or copolymers of ethylene/propylene) polyamides, polyesters or other fibreforming polymers.

Moreover, blends of such polymer, whether homogeneous or heterogeneous, can be used. Fillers and pigments or other colouring agents can also be incorporated.

Laminated sheets of polymeric film can also be used, i.e. two-component or higher-component laminates.

I claim:

1. A net produced by biaxially stretching a melt-embossed film of synthetic polymeric material having on one surface a set of parallel grooves; on the other surface a second set of parallel grooves lying at an angle to the first set, said grooves being sufficiently deep to leave at the groove intersection areas a thin slittable membrane; the grooves in each set defining between themselves a set of parallel ribs; wherein the ratio between (I) the intersection area common to two ribs of different sets and (II) the cross-sectional area of each rib, is not greater than about 2:1 to ensure transmission of orientation through the rib intersection on subsequent stretching.

2. A net as claimed in claim 1 wherein the said ratio I:II prior to stretching is not greater than 1:1.

3. A net as claimed in claim 1 wherein each rib of the film has prior to stretching a trapezoidal cross-section with an included angle of not greater then 45° and its narrower face at the surface of said film.

4. A net as claimed in claim 1 wherein each rib prior to stretching is square in cross-section.

5. A net as claimed in claim 1 wherein each rib prior to stretching has a cross-section wider at the surface of the film than at the interior of said film.

6. A net as claimed in claim 1 in which the film prior to stretching has from 5 to 300 ribs per inch.

7. A net as claimed in claim 1 wherein the sets of ribs prior to stretching intersect at 90°.

8. A net produced by biaxially stretching melt-embossed film of synthetic polymeric material having on one surface a set of straight parallel grooves at a spacing of from 5 to 300 such grooves per transverse inch; on the other surface a second set of straight parallel grooves at 90° to the first set and also at a spacing of from 5 to 300 such grooves per transverse inch, said grooves being sufficiently deep to leave at the groove intersection areas a thin splittable membrane; the grooves in each set defining between themselves a set of parallel ribs wherein the ratio between (I) the intersection area common to two ribs of different sets and (II) the croos-sectional area of each rib is not greater than 2:1.

* * * * *